US010029385B2

(12) United States Patent
Hoover et al.

(10) Patent No.: US 10,029,385 B2
(45) Date of Patent: Jul. 24, 2018

(54) WORKPIECE HOLDDOWN APPARATUS FOR A BANDSAW

(71) Applicants: Lloyd R. Hoover, Lititz, PA (US); Justin Hoover, Ephrata, PA (US)

(72) Inventors: Lloyd R. Hoover, Lititz, PA (US); Justin Hoover, Ephrata, PA (US)

( * ) Notice: Subject to any disclaimer, the term of this patent is extended or adjusted under 35 U.S.C. 154(b) by 525 days.

(21) Appl. No.: 14/706,447

(22) Filed: May 7, 2015

(65) Prior Publication Data

US 2015/0321379 A1  Nov. 12, 2015

Related U.S. Application Data

(60) Provisional application No. 61/991,655, filed on May 12, 2014.

(51) Int. Cl.
| | |
|---|---|
| *B27B 25/02* | (2006.01) |
| *B27B 25/04* | (2006.01) |
| *B27B 25/06* | (2006.01) |
| *B23D 55/04* | (2006.01) |

(52) U.S. Cl.
CPC ............ *B27B 25/02* (2013.01); *B23D 55/046* (2013.01); *B27B 25/04* (2013.01); *B27B 25/06* (2013.01)

(58) Field of Classification Search
CPC ......... B27B 25/00; B27B 25/02; B27B 25/04; B27B 25/06; B27B 25/08; B27B 25/10; B23D 55/04; B23D 55/043; B23D 55/046; B23Q 3/00; B23Q 3/002; B23Q 3/005; B23Q 3/02; B23Q 3/04; B23Q 3/06
USPC ..................................................... 83/447.45
See application file for complete search history.

(56) References Cited

U.S. PATENT DOCUMENTS

| | | | | |
|---|---|---|---|---|
| 259,661 | A | * 6/1882 | Bowker | B27G 19/02 |
| | | | | 83/102.1 |
| 971,685 | A | 10/1910 | Mershon | |
| 1,947,728 | A | 2/1934 | Mitchell | |
| 2,679,871 | A | 6/1954 | Ford | |
| 2,731,049 | A | * 1/1956 | Akin | B27G 19/02 |
| | | | | 144/251.1 |
| 3,671,032 | A | * 6/1972 | Gettinger | B25H 5/00 |
| | | | | 269/131 |
| 3,866,502 | A | * 2/1975 | Brewer, Sr. | B23D 45/06 |
| | | | | 83/425.3 |
| 4,009,741 | A | * 3/1977 | Zimmerman | B23D 45/105 |
| | | | | 144/250.13 |

(Continued)

FOREIGN PATENT DOCUMENTS

DE          3423630 A1     1/1986

*Primary Examiner* — Jason Daniel Prone
*Assistant Examiner* — Richard Crosby, Jr.
(74) *Attorney, Agent, or Firm* — Patent Law Associates

(57) ABSTRACT

A hold down mechanism for a bandsaw including an upstream wheel positioned upstream of the saw blade and a downstream wheel positioned downstream of the saw blade, each wheel being rotationally connected to a bogie which is in turn supported on a swing arm. The proximity of the upstream and downstream wheels to the saw blade as well as the degree of pivoting motion permitted by the bogie enable a hold down wheel to press the ends if sequential workpieces against a base as the ends pass the saw blade to assure a uniform thickness of the cut workpiece. An angled guide surface is provide upstream from the forward wheel to assist the forward wheel in elevating when a trailing workpiece is significantly thicker than the workpiece preceding.

9 Claims, 11 Drawing Sheets

(56) References Cited

U.S. PATENT DOCUMENTS

| | | | | |
|---|---|---|---|---|
| 4,127,044 A | * | 11/1978 | Kenyon | B27B 1/007 144/248.5 |
| 4,163,491 A | * | 8/1979 | Rock | B27L 5/002 198/836.2 |
| 4,469,318 A | * | 9/1984 | Slavic | B23Q 3/002 144/250.15 |
| 4,528,881 A | * | 7/1985 | Harris | B26D 7/0675 144/242.1 |
| 4,696,392 A | * | 9/1987 | Chisholm, Jr. | B65H 5/025 144/247 |
| 4,881,584 A | * | 11/1989 | Wislocker | B27B 1/007 144/245.2 |
| 4,938,111 A | * | 7/1990 | Masse | B23Q 11/0866 83/425.3 |
| 4,997,017 A | * | 3/1991 | Dobbie | B27B 25/04 144/117.1 |
| RE34,125 E | * | 11/1992 | Amos | B23Q 3/002 144/250.14 |
| 5,287,782 A | * | 2/1994 | Scott | B23Q 3/002 83/422 |
| 6,128,989 A | * | 10/2000 | Jones | B23D 47/005 144/247 |
| 7,007,729 B1 | * | 3/2006 | Landers | B27B 31/00 144/215.2 |
| 7,150,216 B2 | * | 12/2006 | Lavoie | B26D 5/22 83/873 |
| 7,255,336 B2 | | 8/2007 | Terabe et al. | |
| 7,308,921 B1 | * | 12/2007 | Brewer, Sr. | B27B 15/02 144/3.1 |
| 7,631,748 B2 | * | 12/2009 | Mitchell | B27B 31/006 198/463.1 |
| 8,371,198 B2 | * | 2/2013 | Babine | B27B 25/02 83/441.1 |
| 8,931,528 B2 | * | 1/2015 | Hsiung | B27B 25/10 144/242.1 |
| 8,979,084 B2 | * | 3/2015 | Lucas | B23D 47/005 269/56 |
| 9,545,704 B2 | * | 1/2017 | Guillot | B25B 1/20 |
| 2013/0315692 A1 | | 11/2013 | Hsiung | |
| 2014/0360627 A1 | * | 12/2014 | Sung | B27B 25/02 144/248.4 |
| 2015/0321379 A1 | * | 11/2015 | Hoover | B23D 55/046 144/376 |

* cited by examiner

WORKPIECE HOLDDOWN APPARATUS FOR A BANDSAW

CROSS-REFERENCE TO RELATED APPLICATIONS

This application claims the benefit of priority of U.S. Provisional Application 61/991,655, filed May 12, 2014.

BACKGROUND OF THE INVENTION

The present application relates generally to the field of sawing lumber into planks and, more particularly, to an improved work piece hold down apparatus for feeding lumber stock of varying thickness into a horizontal bandsaw.

Shipping pallets provide a flat surface for supporting goods stacked thereon in an elevated position suitable for lifting by a forklift. It is estimated that there are over two billion pallets in use in the United States and that roughly one-half billion new pallets per year are needed. This demand drives the need for machines capable of producing the necessary quantity of planks suitable for pallet construction.

One such machine for producing rough planks for pallet construction incorporates a pair of generally horizontal band saw blades arranged in series along a feed path. Work pieces of varying thickness and length are fed in series along the feed path. As the work pieces reach the saw, the first bandsaw longitudinally cuts a portion of the work piece into a thick plank having a thickness roughly twice that of the desired thickness. The second bandsaw then cuts the thick plank in half longitudinally resulting in a pair of planks of the desired thickness. Any excess thickness of the feed stock extending above the first cut is re-circulated in the machine and fed through again until no more planks of the desired thickness can be cut from the feed stock.

One or more work piece hold down mechanisms is provided in the feed path to maintain the work piece firmly against the base to assure uniform thickness of the planks. These hold down mechanism are typically in the form of a wheel that rides along the top of the work piece as it travels along the feed path that is spring biased to press the work piece against the base. The mechanisms are generally positioned just upstream of the bandsaw blades. Problems arise as work pieces of different thickness are sequentially fed. Known hold down wheels lose contact with the work piece of lesser thickness as the hold down wheel steps up or down to the piece of greater thickness. During this transition, the work piece of lesser thickness is not firmly pressed against the base which can result in the plank thickness being less than desired. The thickness deviations can be large enough to render the plank unusable.

It would be advantageous to provide an improved hold down mechanism that would overcome these disadvantages and improve production efficiency.

SUMMARY OF THE INVENTION

Accordingly, the present invention, in any of the embodiments described herein, may provide one or more of the following advantages:

According to one embodiment of the present invention, a plank production machine is provided having one or more band saws arranged transverse to a work piece feed path and parallel to a reference base. Elongate work pieces or varying thickness are moved sequentially along the feed path toward the saw blade. The saw blade is positioned a pre-determined distance above the reference base to produce a plank of a desired thickness as the work piece moves past the saw blade. Immediately above the saw blade is a hold down mechanism configured to apply downward pressure on the work piece as it engages the saw blade. The hold down mechanism includes an upstream wheel positioned upstream of the saw blade and a downstream wheel positioned downstream of the saw blade, each wheel being rotationally connected to a bogie which is in turn pivotally supported on a swing arm. The upstream and downstream wheels are positioned in the feedpath so that at least one of the wheels remains engaged on adjacent upstream and downstream work pieces moving in the feed path as the work pieces engage the saw blade. In this manner, a relatively thin piece work piece is held firmly to the reference base as its trailing end is sawn while a relatively thick piece following the relatively thin piece is firmly held against the reference base as it approaches the saw blade.

In another embodiment, multiple hold down mechanism are provided on a machine having multiple band saws arranged in series (upstream-downstream) along a feed path. The configuration of the downstream hold down mechanism may be altered in order to fit into a more compact space. Increasing the number of cuts made to a given work piece per pass increases the production efficiency of the machine. A machine having two band saws in series along the feed path is preferred.

In another aspect of the invention, at least one and possibly both of the hold down wheels may be powered or otherwise rotationally interlocked with a work piece feed mechanism on the feed path to control movement of the work pieces along the feed path. The peripheral contact surfaces of the driven hold down wheels may include teeth or the like for engaging the work piece and preventing relative movement of the wheel and work piece. Driven hold down wheels will also more readily "climb" onto a trailing work piece having a thickness significantly greater than the work piece preceding. Even greater differences in work piece thicknesses may be accommodated with the addition of an angled upper conveyor having one end normally positioned at a greater distance from the conveyor base than the thickest anticipated work piece.

The present invention provides a plank production machine having one or more band saws arranged transverse to a work piece feed path and parallel to a reference base. Immediately above each saw blade is a hold down mechanism configured to apply downward pressure on work pieces moving along the feed path adjacent to the engagement point with the saw blade. The hold down mechanism includes an upstream wheel positioned upstream of the saw blade and a downstream wheel positioned downstream of the saw blade, each wheel being rotationally connected to a bogie which is in turn supported on a swing arm. The weight of the swing arm with its connected bogie and hold down wheels is sufficient downwardly bias the mechanism to maintain the hold down wheels in contact with the top of the work pieces passing below. A simple spring element may be included to increase the downward bias pressure of the hold down mechanism.

The hold down mechanism featuring a bogie-mounted upstream and downstream wheels supported on a swing arm wherein the weight of the assembly provides sufficient hold down force to maintain the work pieces in secure contact with a base surface that is of simple design, easy to use, and cost effective to manufacture.

These and other objects are achieved in accordance with the present invention by providing a hold down mechanism for a bandsaw including an upstream wheel positioned upstream of the saw blade and a downstream wheel positioned downstream of the saw blade, each wheel being rotationally connected to a bogie which is in turn supported on a swing arm. The proximity of the upstream and downstream wheels to the saw blade as well as the degree of pivoting motion permitted by the bogie enable a hold down wheel to press the ends if sequential workpieces against a base as the ends pass the saw blade to assure a uniform thickness of the cut workpiece. An angled guide surface is provide upstream from the forward wheel to assist the forward wheel in elevating when a trailing workpiece is significantly thicker than the workpiece preceding.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "up" or "down" or "top" or "bottom" are used as a matter of mere convenience, and are determined as the machine would normally be positioned for operation. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
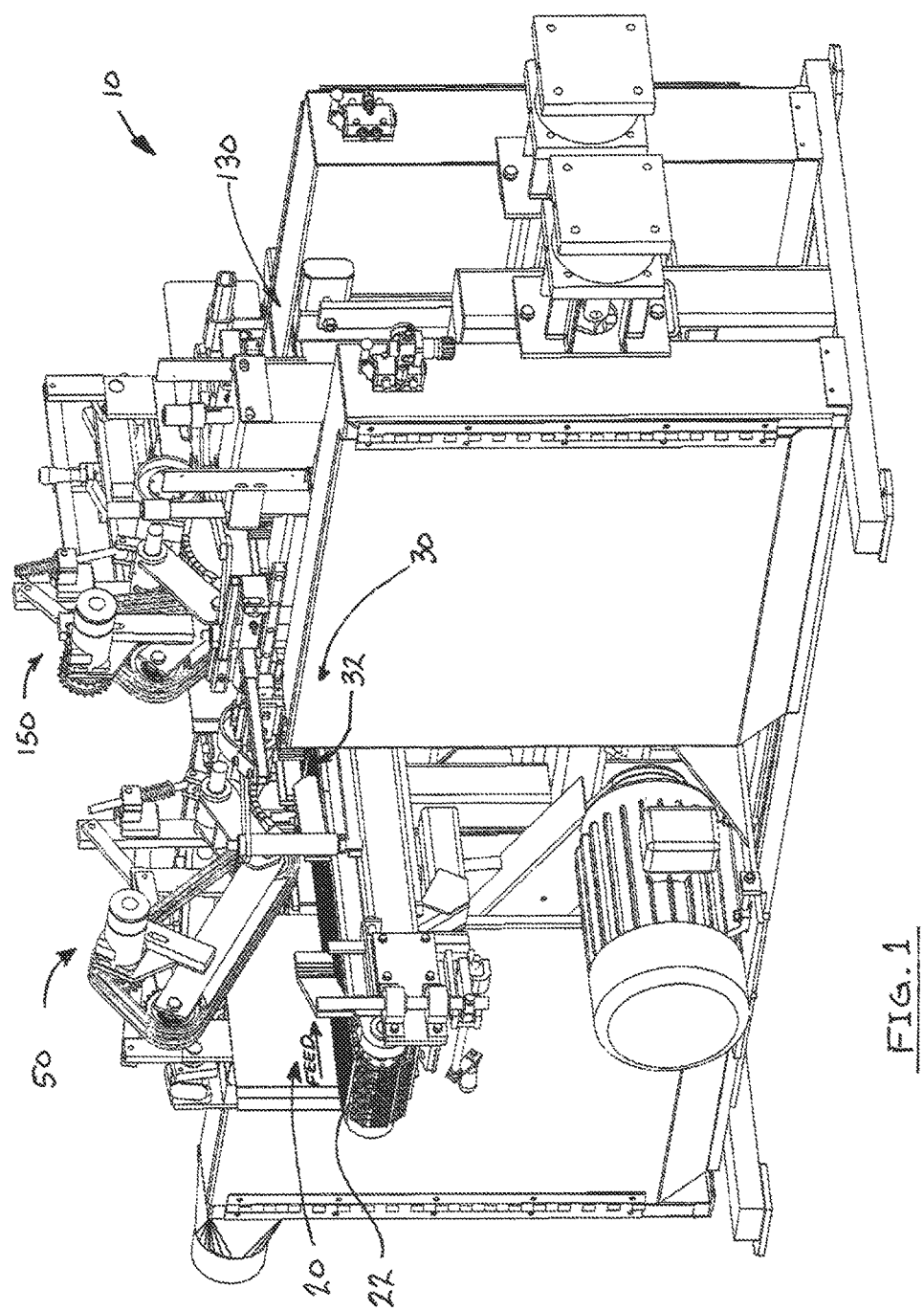
FIG. 1 is a perspective view of a plank sawing machine on which the present invention is useful.
Figure 2:
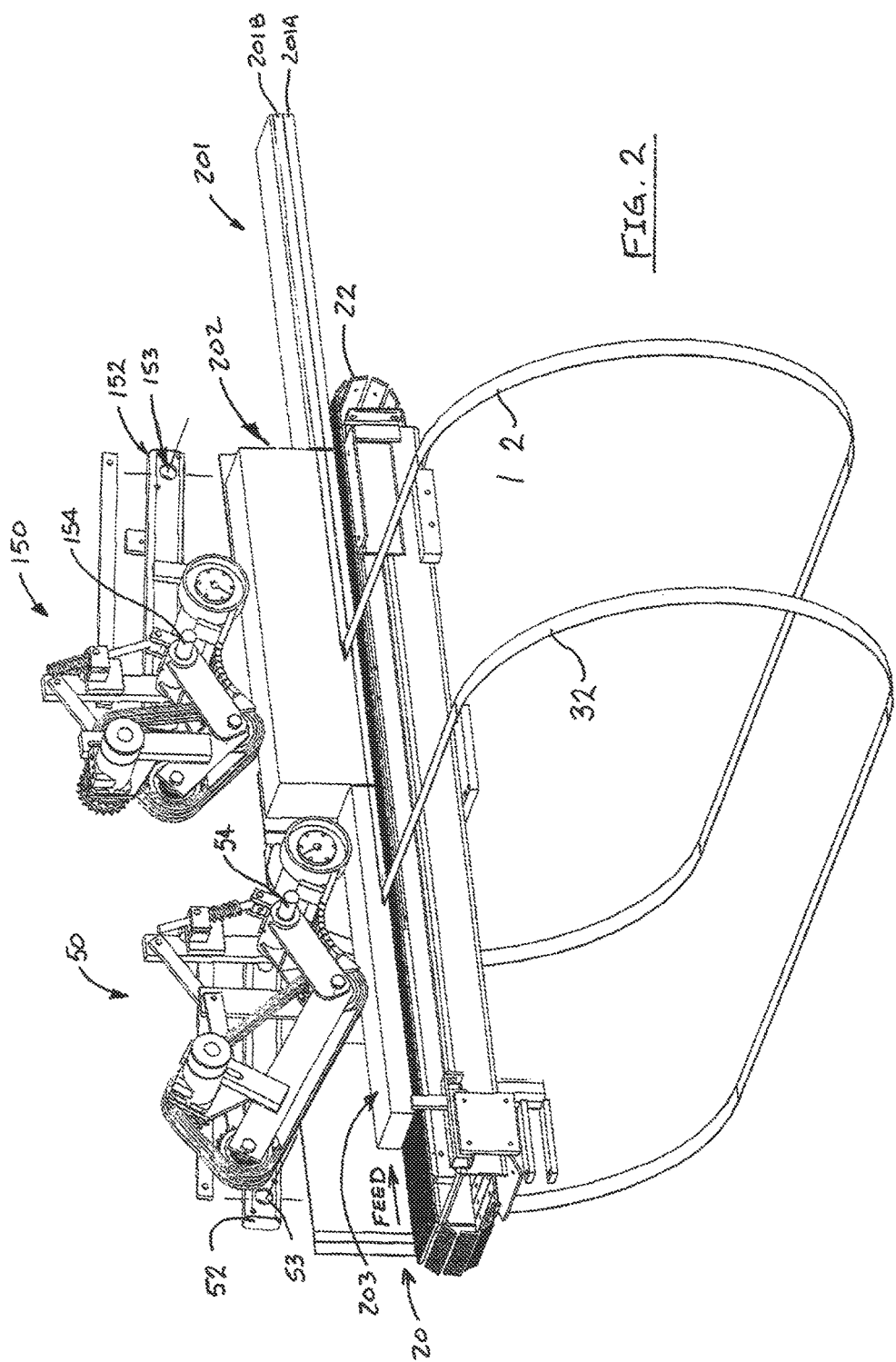
FIG. 2 is partial perspective view of the plank sawing machine of FIG. 1 highlighting the feed path and hold down mechanisms of the present invention.
Figure 3:
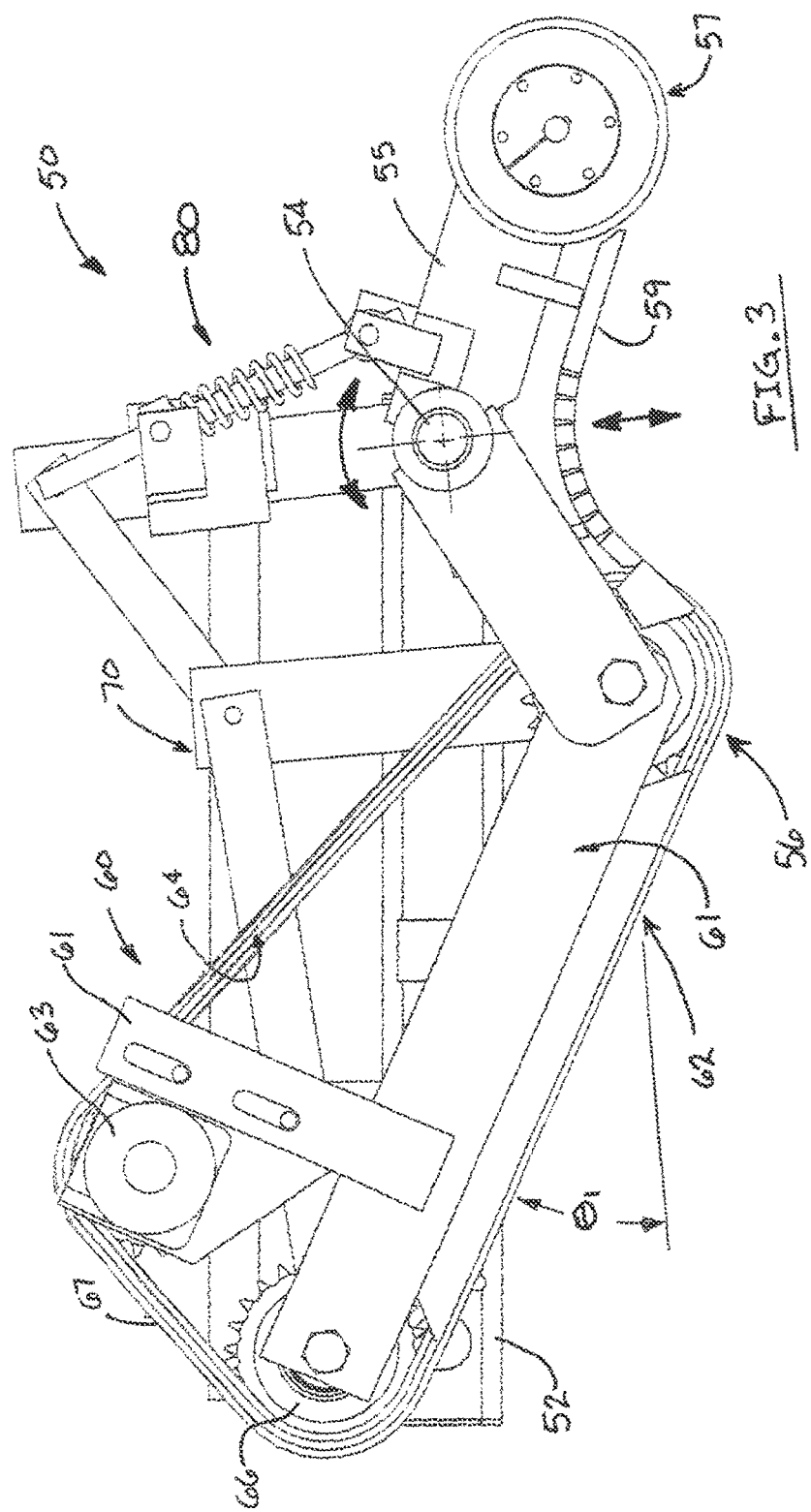
FIG. 3 is an elevation view of a first embodiment of a hold down mechanism incorporating aspects of the present invention.
Figure 4:
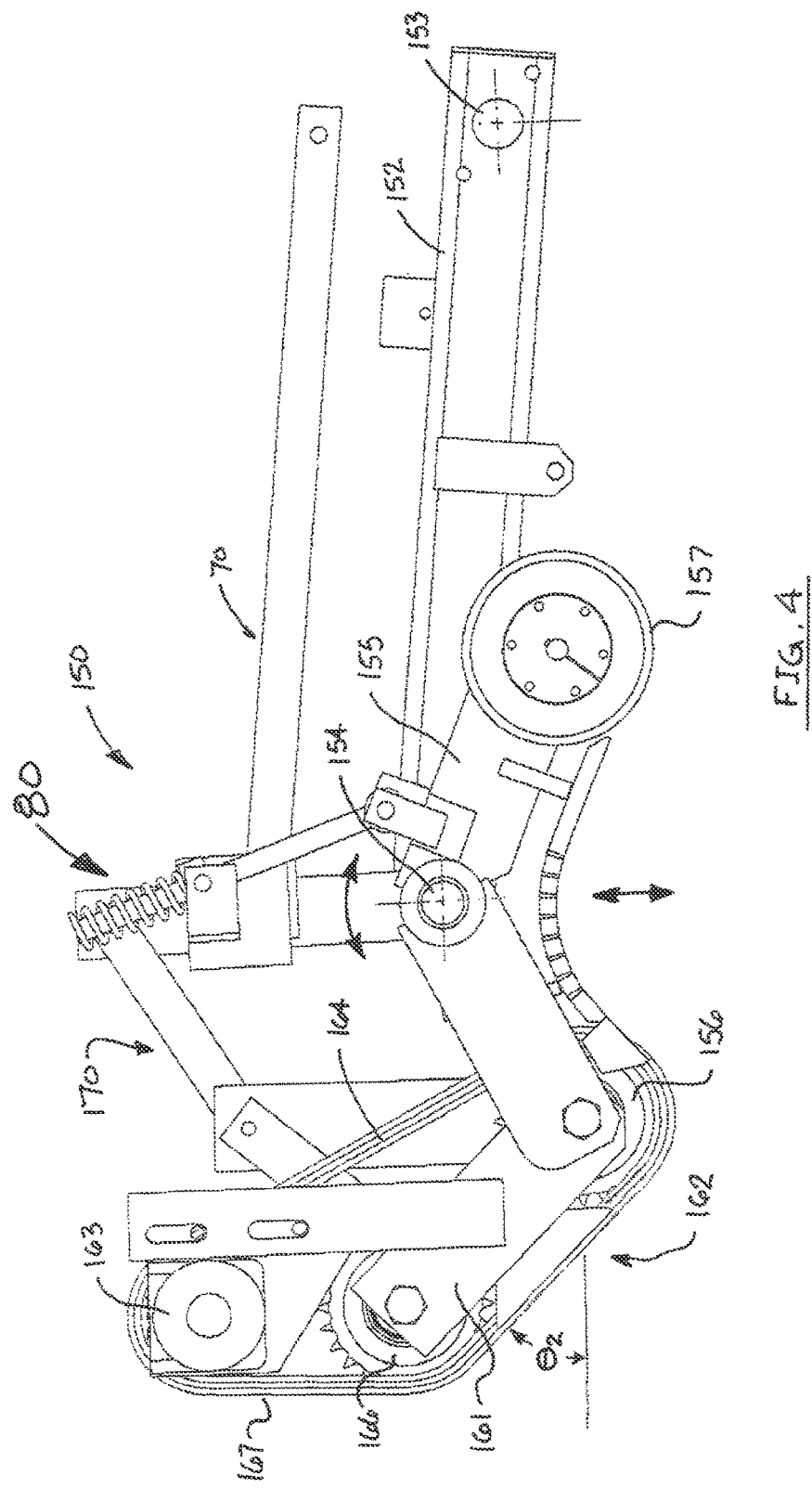
FIG. 4 is a an elevation view of a second embodiment of the hold down mechanism of FIG. 3, optimized for use as a second or trailing hold down mechanism on an industrial saw.
Figure 5:
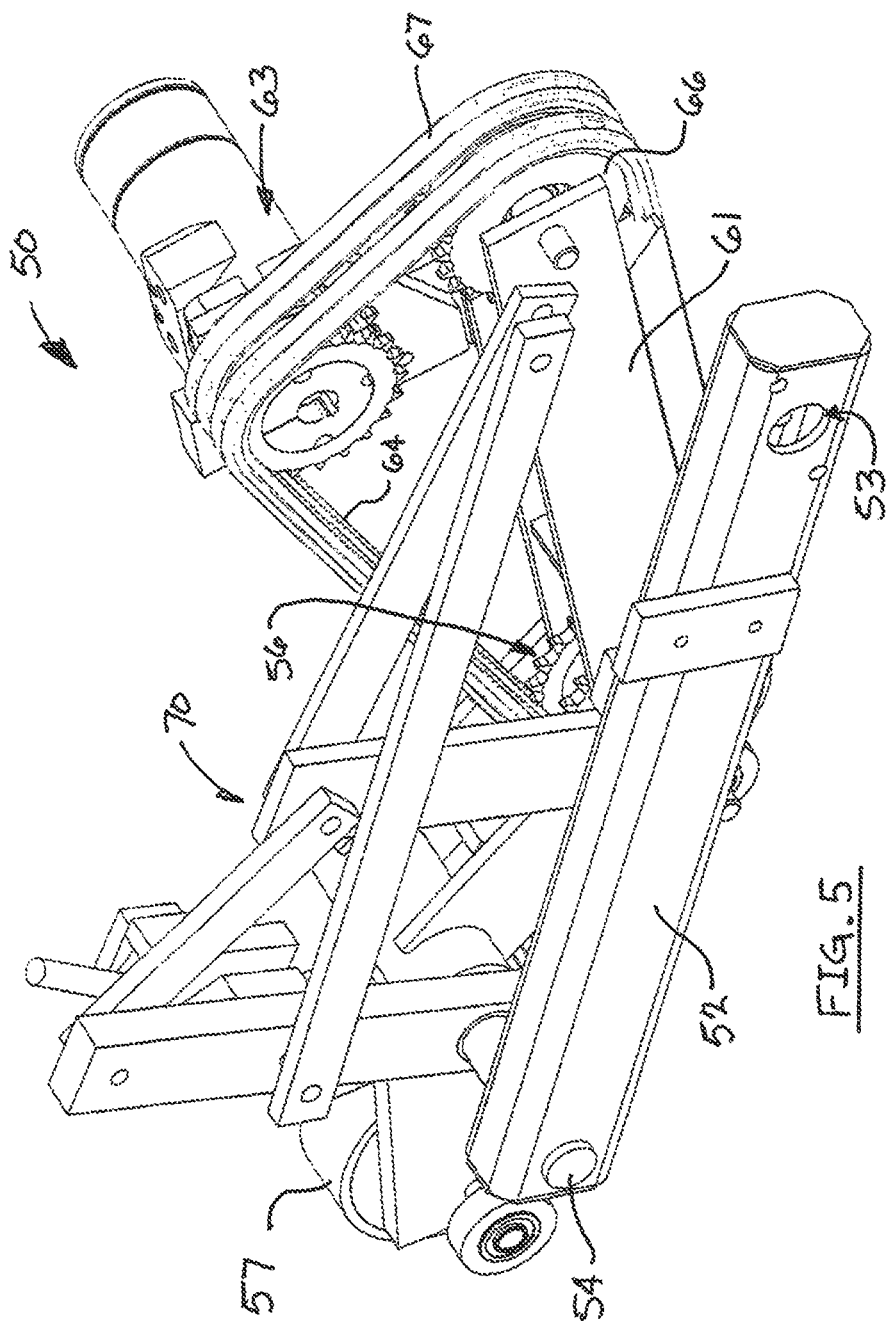
FIGS. 5 and 6 provide additional views of the hold down mechanisms illustrated in FIGS. 3 and 4, respectively.
Figure 6:
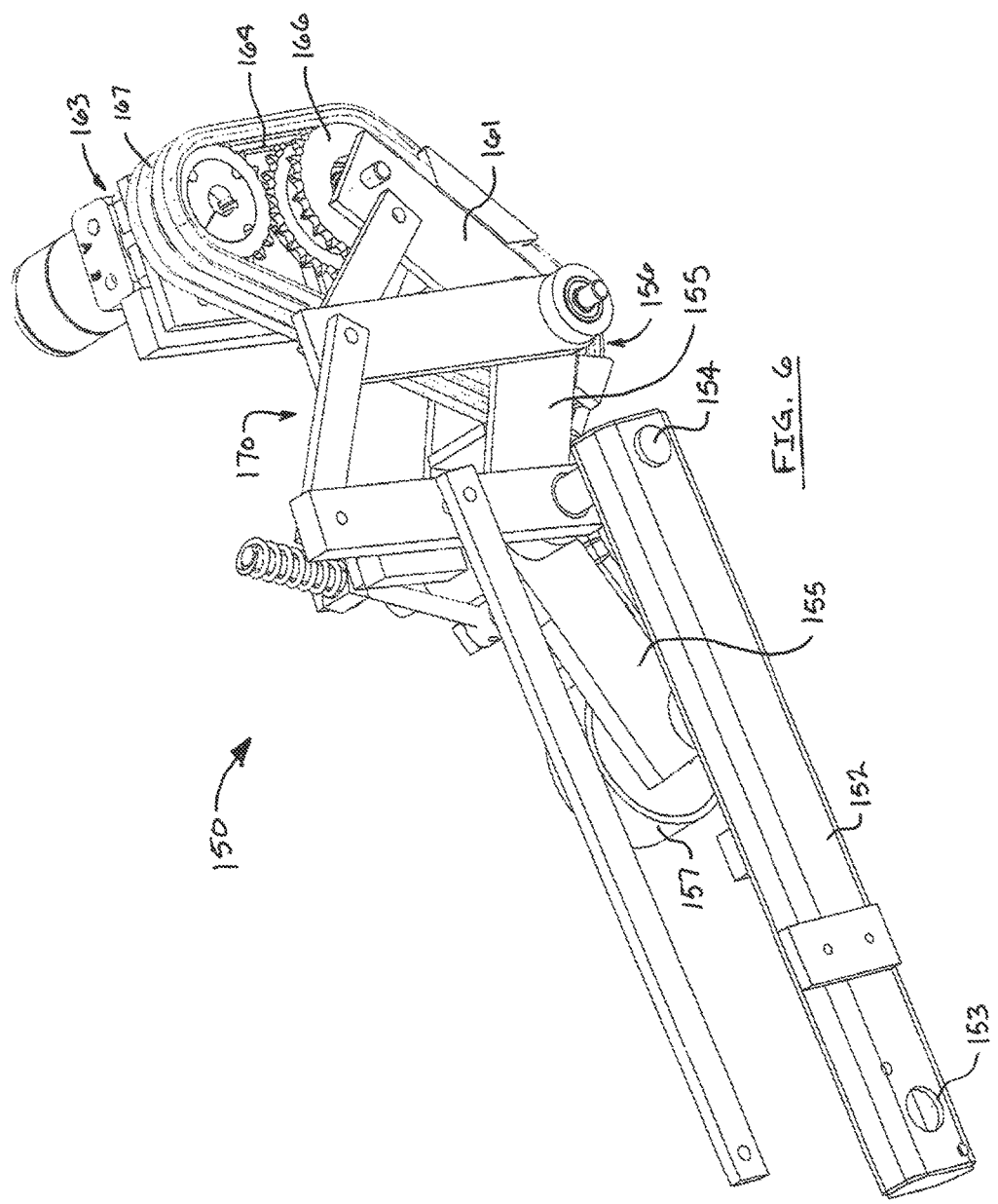

In FIGS. 1 and 2 there is illustrated an industrial saw 10 for producing wooden planks of a desired thickness from thicker stock. The machine includes a base frame-supported feed path 20 with a base conveyor 22 along which work pieces of wooden stock 201, 202, 203 are moved by base conveyor 22 and at least one saw 30 arranged generally transverse to the feed path 20. The base conveyor 22 is in the form of an endless loop driven by well-known means at a pre-determined speed selected on the characteristics of the wooden stock being cut and the saw 30. The outer periphery of the base conveyor 22 includes a surface that will engage and propel the wooden stock to and past the saw 30. As the wooden stock is moved along the feed path 20 in the direction of its length and engaged by the saw 30, the stock is cut into two pieces, the lower piece having a thickness established by the spacing of the saw blade 32 above the base. In the saw 10 shown, a second saw 130 located downstream of the first saw 30 is positioned to make a second cut of the work piece so that two planks 201A, 201B are cut from a single pass of a work piece through the machine 10. Portions of the work pieces that have not been cut to the desired thickness (i.e., the portion of each work piece above the highest saw blade) are recirculated by a material handling apparatus to make additional passes through the industrial saw 10 until no more planks can be cut from the work piece.

The speed at which wooden stock is moved along the feed path is dependent upon the width of the stock transverse to the feedpath and the capability of the band saw. Increasing feed rates require greater input power to the saw and can lead to deformation of the saw blade with resultant unevenness in the cut. Increasing the width of the feed stock has a similar effect on saw performance. Wider stock requires a lower feed rate than narrower stock. In the embodiment shown using feed stock having a width of approximately four inches, feed rates of 120 feet per minute are typical.

The feed path 20 of the industrial saw 10 is shown comprising a moving conveyor base 22 which is powered to move work pieces 201, 202, 203 along the feed path 20. In order to maintain the work pieces in contact with the base 22 as the work pieces are fed into the saw blades 23, 132, two work piece hold down mechanisms 50, 150 are provided. Each hold down mechanism is supported at the end of a respective main carrier swing arm 52, 152 pivotally connected to the base frame of the machine 10 at a first end 53, 153 and supporting the hold down mechanisms 50, 150 at the opposite end. Pivoting movement of the swing arms 52, 152 allows vertical movement of the hold down mechanisms 50, 150 to accommodate variations in work piece thickness. Each hold down mechanism is connected to a respective swing arm at a pivoting connector 54, 154.

As each hold down mechanism is functionally similar, further discussion uses reference numbering for the first hold down mechanism. Reference numbering for the second hold down mechanism is increased by 100.

In FIGS. 3 through 6 it can be seen that the hold down mechanism 50 comprises the aforementioned pivoting connector 54 which connects to the swing arm 52. The connector 54 is preferably in the form of a spindle rigidly connected to the swing arm. A bogie frame 55 is pivotally coupled to the pivoting connector 54 and supports a leading hold down wheel 56 and a trailing hold down wheel 57, each wheel rotatably connected to the bogie frame 55. The bogie frame 55 is pivotable between generally opposing extreme positions corresponding to either the leading or trailing hold down wheel being elevated to a maximum extent while the opposite hold down wheel rests on the conveyor base 22. The hold down wheels have a width that is sufficient to hold the work pieces squarely against the base conveyor and to apply a necessary downward force onto the work pieces without indenting the wood.

At least the leading hold down wheel 56 is powered by a drive mechanism 60. The drive mechanism 60 enables the leading hold down wheel to climb up to the top surface of trailing work pieces that are significantly taller that the work pieces preceding. The peripheral speed of a driven hold down wheel is matched to the speed of the base conveyor 22 so that work pieces are moved in a linear manner to and through the saw blade to produce sawn planks of uniform thickness. The trailing hold down wheel 57 may also be powered by the same mechanism or by a duplicate drive mechanism. In the preferred embodiment, the drive mechanism 60 for the leading drive wheel 56 includes an angled upper conveyor 62 comprising a driver 63, a drive chain 64, and one or more idler wheels 66 which, with the hold down wheel form a track for the drive chain 64 to encircle. The driver 63 may be powered by conventional means including, but not limited to electric, hydraulic, or pneumatic. The chain 64 is preferably fitted with engagement teeth 67 outwardly facing from the outer periphery to enable the drive chain 64 to firmly engage the wooden work pieces and, along with the base conveyor 22, control the travel velocity of the work pieces.

The bogie frame 55 is pivotable in generally opposing directions about the pivoting connector. This pivoting movement enables the leading hold down wheel 56 to move vertically to the upper surface of a trailing work piece while the trailing hold down wheel 57 continues to provide downward pressure on the leading work piece as the respective ends of the adjacent work pieces pass the saw blade. While not limited, pivoting of the bogie frame between the opposing extreme positions is on the order of 45-50 degrees in normal usage and should not exceed 90 degrees for even the most extreme variations in workpiece thickness. The positioning of the leading and trailing hold down wheels along the feed path in relation to the saw blade is configured so that each work piece is held under one of the hold down wheels as the adjacent ends of the work pieces are moved past the saw blade. The bogie frame 55 may also include an intermediate guide member 59 to assist movement of the bogie frame 55 from relatively thin work pieces to relatively thick work pieces by providing a smooth, contoured surface which prevents leading corners of the trailing work piece from entangling with the bogie frame.

As shown, elements of the drive mechanism 60 are supported by a drive frame 61 which is connected to the bogie frame for movement therewith. A linkage 70 is provided to move the drive mechanism 60 in unison with the bogie frame so that the angle $\Theta 1$ of the upper conveyor 62 remains substantially unchanged, possibly varying only a few degrees, as the hold down mechanism 50 moves vertically responsive to the work pieces travelling along the feed path. The angle of the upper conveyor 62 is selected to use the minimum angle that will fit into the linear space along the feed path that is available. As can be seen from the downstream hold down mechanism 150 (FIG. 4), space along the feed path may be limited. As such, the angle $\Theta 2$ of the upper conveyor 162 on the downstream hold down mechanism 150 is comparatively steep. In the preferred embodiment, the angle of the downstream upper conveyor 162 is 46 degrees from the horizontal plane of the conveyor base 22. Increasing the angle significantly greater than approximately 50 degrees increases the tendency for a work piece to be slowed or stopped relative to the moving base conveyor 22 leading to mis-feeding of the work pieces. In the extreme, feed movement of a work piece can be stopped entirely if the upper conveyor angle is too abrupt. The preferred angle $\Theta 1$ of the upstream or leading upper conveyor 62 is 30 degrees, an angle that balances space along the feed path and maximum work piece thickness step that can be accommodated. It is also noted that the downstream upper conveyor 162 may be angled more steeply than the upstream upper conveyor 62 since work pieces impinging on the downstream upper conveyor 162 are being pushed by the upstream hold down mechanism 50. Another advantage of a upper conveyor configured as shown is that it can assist moving the leading hold down wheel up to the top surface of a work piece that is significantly thicker that the work piece preceding.

The weight of the drive mechanism is sufficient downwardly bias the mechanism to maintain the hold down wheels in contact with the top of the work pieces passing below and maintain the workpieces in firm contact with the drive conveyor. A simple spring element 80 acting upon the swing arm or other movable portion of the mechanism may be included to increase the downward bias pressure of the hold down mechanism 50.

Figure 7:
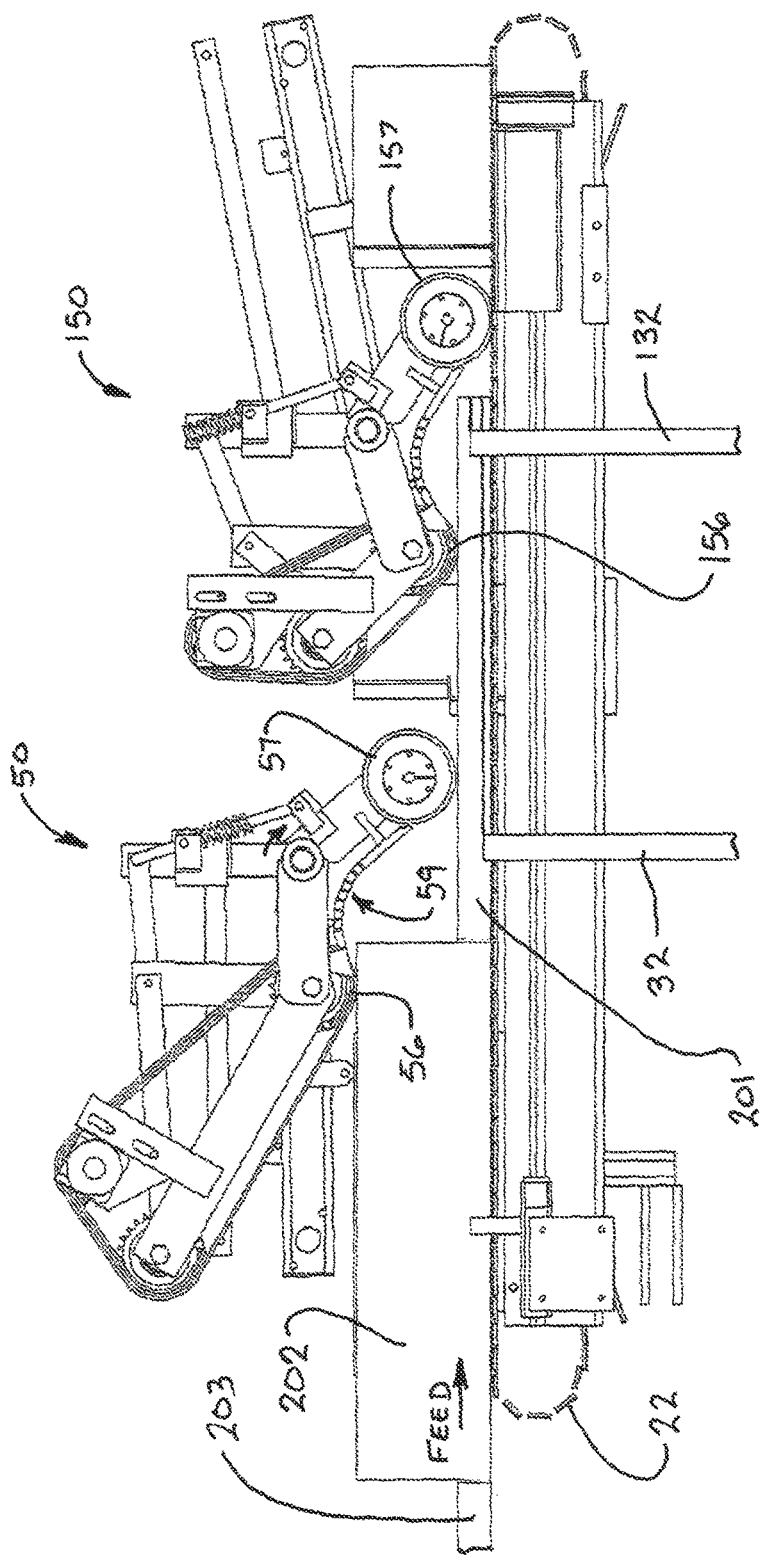
FIGS. 7 through 11 illustrate movement of the hold down mechanisms as a stream of work pieces of varying thickness are fed through the saw.

As is illustrated in FIGS. 7 through 11, the advantage of the bogie frame with a leading hold down wheel 56 and a trailing hold down wheel 57 is that the hold down pressure may be applied on adjacent work pieces for longer durations compared to machines using a single, swing-arm mounted hold down wheel, especially during the critical moments when the trailing end of a leading piece and the leading end of a trailing piece approach the saw blade. In FIG. 7, a leading end of a first work piece 201 has just engaged the second saw blade 132 and is being held down by the leading hold down wheel 156 of the second hold down mechanism 150. A trailing end of the first work piece 201 has almost passed the first saw blade 32. The leading end of a second work piece 202 having a thickness greater than the first work piece 201 follows the first work piece 201. At the transition point between the two work pieces as the saw blade 32 transitions from the first work piece 201 to the second work piece 202, the leading hold down wheel 56 has moved to the top of the second work piece 202 while the trailing hold down wheel 57 continues to be engaged with the first work piece thereby keeping the respective ends of both ends firmly positioned against the base conveyor 22. Intermediate guide member 59 may contact the upper leading corner of the second work piece 202 to aid the trailing hold down wheel 57 step up to the upper surface of the second work piece.

Figure 8:
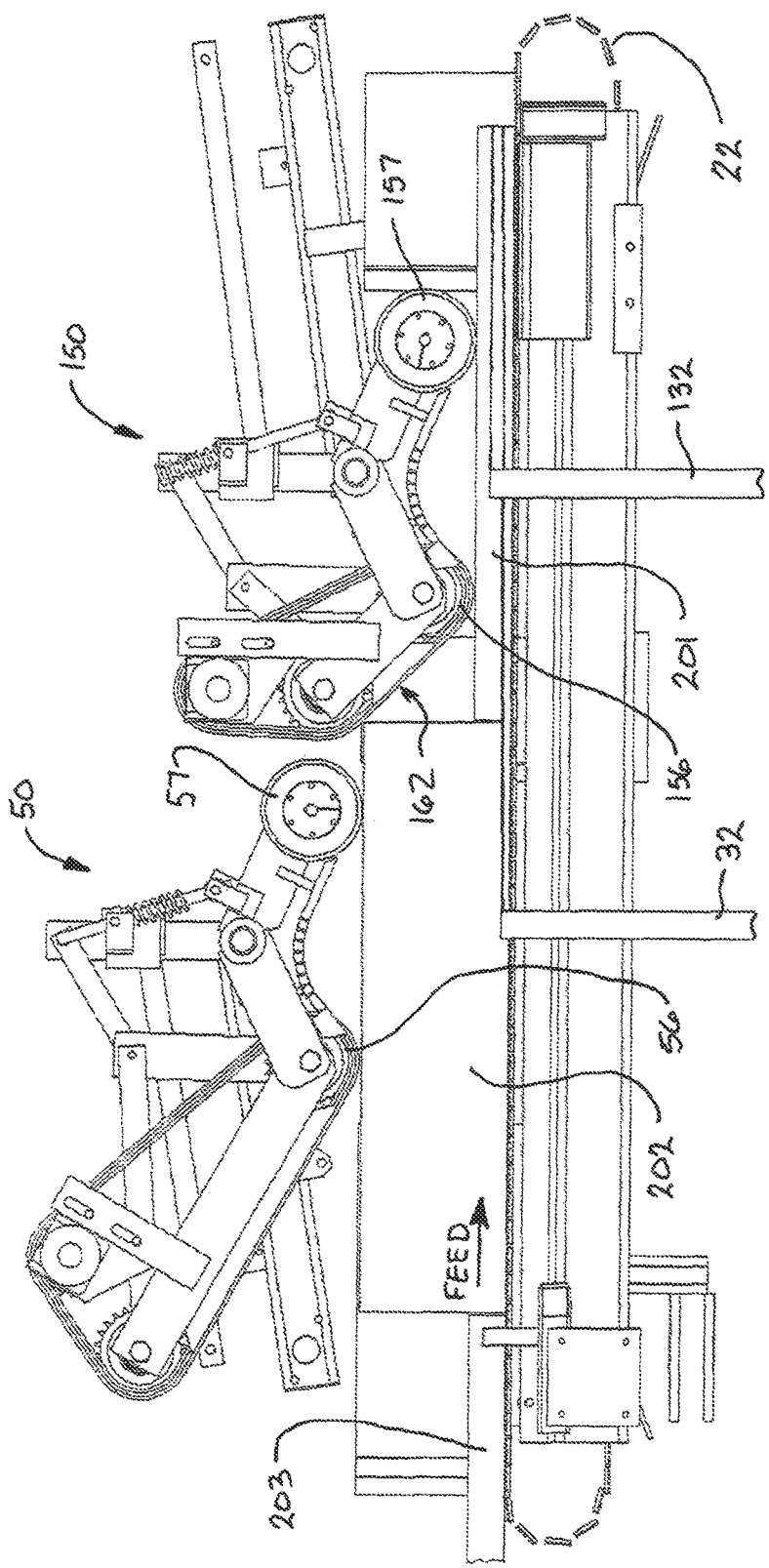

In FIG. 8, the first work piece 201 has advanced and is engaged on the second saw blade 132. The trailing hold down wheel 57 on the first mechanism 50 has moved up from its position in FIG. 7 and is now on the top surface of the second work piece 202 and it is being fed through the saw blade 32. Further downstream, the leading hold down wheel 156 and trailing hold down wheel 157 of the second hold down mechanism 150 are both in contact with the upper surface of the first work piece 201, but the leading hold down wheel 156 will soon make the same transition as the leading hold down mechanism 50 made in FIG. 7. Note that the angled upper conveyor 162 has engaged the upper leading end of the second work piece 202 and will pull the leading hold down wheel 156 up to the upper surface of the second work piece 202 as it advances along the feed path 22.

Figure 9:
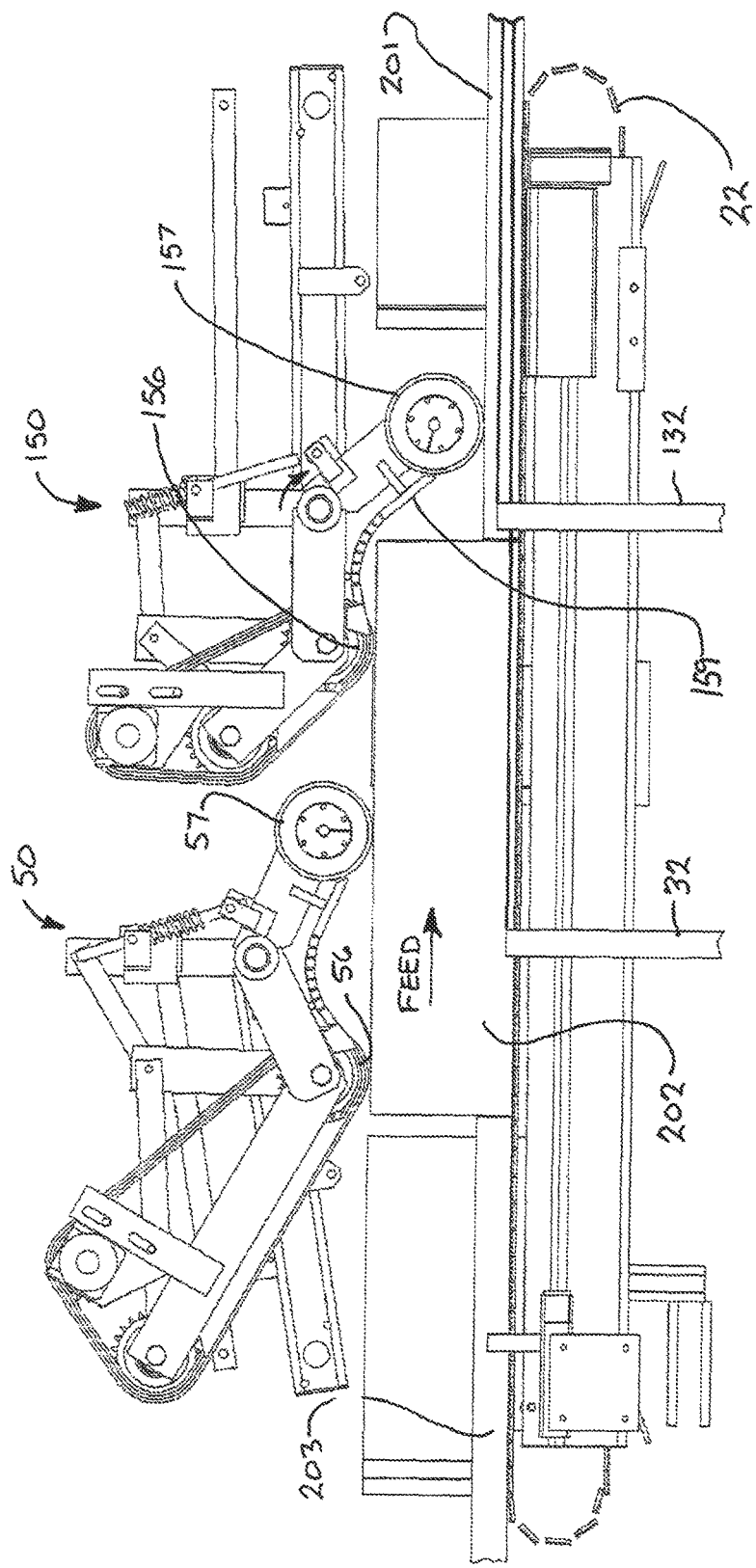

In FIG. 9, the leading hold down wheel of the first hold down mechanism 50 is near the trailing end of the second work piece 202 and soon to move downward to the upper surface of the third work piece 203. The leading hold down wheel 156 of the second hold down mechanism 150 has moved into position on the upper surface of the second work piece as its leading end approaches the second saw to maintain the leading end firmly against the base conveyor 22. As happened when the first hold down mechanism stepped up onto the significantly thicker second work piece, intermediate guide member 159 may contact the upper leading corner of the second work piece 202 to aid the trailing hold down wheel 157 step up to the upper surface of the second work piece. The trailing wheel 157 of the second hold down mechanism 150 remains on the upper surface of the first work piece 201 as the trailing end moves through the saw blade 92 to maintain the trailing end in firm contact with the base conveyor 22.

Figure 10:
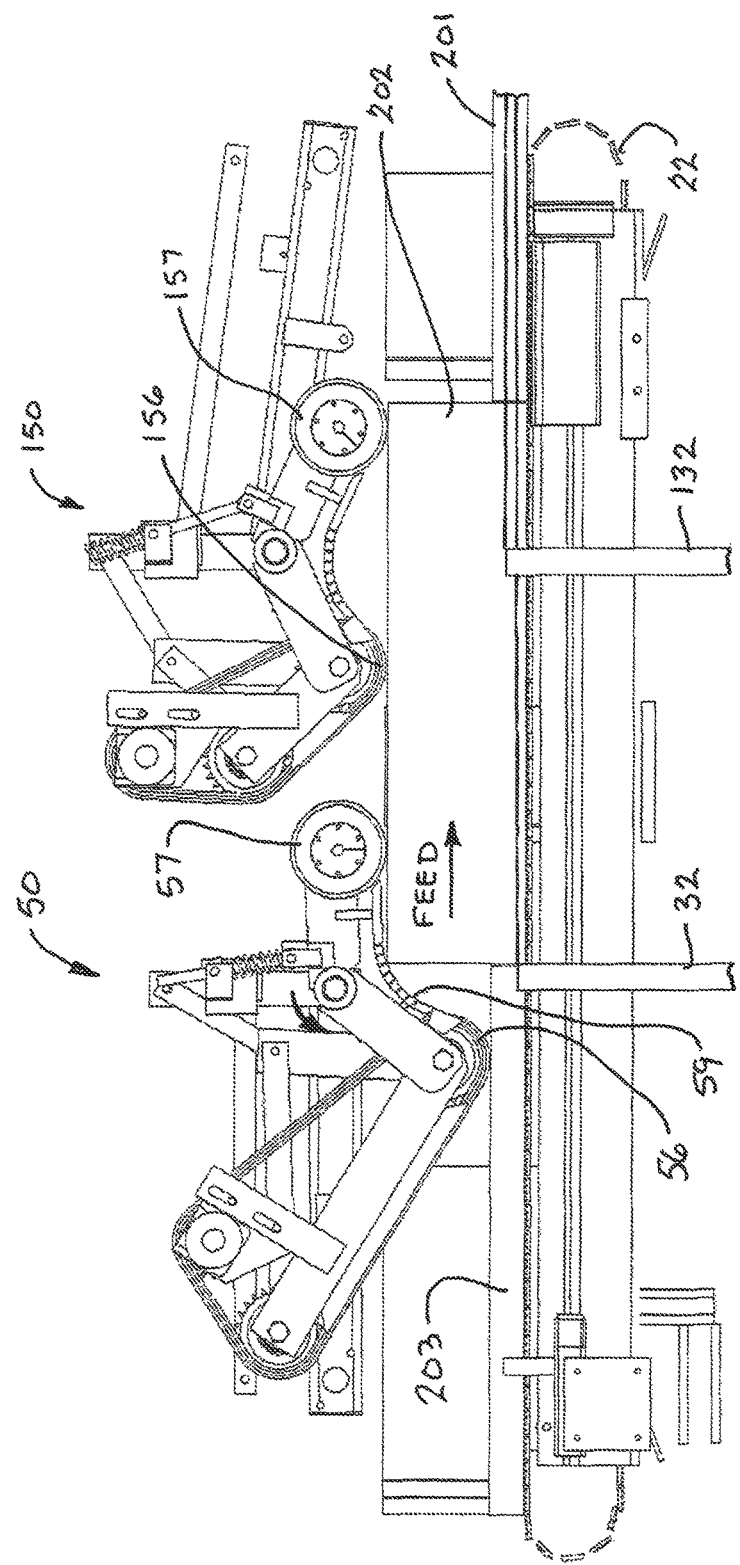

In FIG. 10, the first work piece 201 has moved past the second saw blade 132 and the second work piece 202 is engaged thereon. Both hold down wheels on the second hold down mechanism 150 are on the upper surface of the second work piece. The trailing hold down wheel 57 of the first hold down mechanism 50 is also on the upper surface of the second work piece 202 as the trailing end passes the first saw blade 32, but the leading hold down wheel 56 of the first hold down mechanism 50 has moved into position atop the third work piece 203 as its leading end approaches the first saw blade 32 showing how the adjacent ends of two work pieces are each held firmly against the conveyor base 22 as the ends pass the saw blade.

Figure 11:
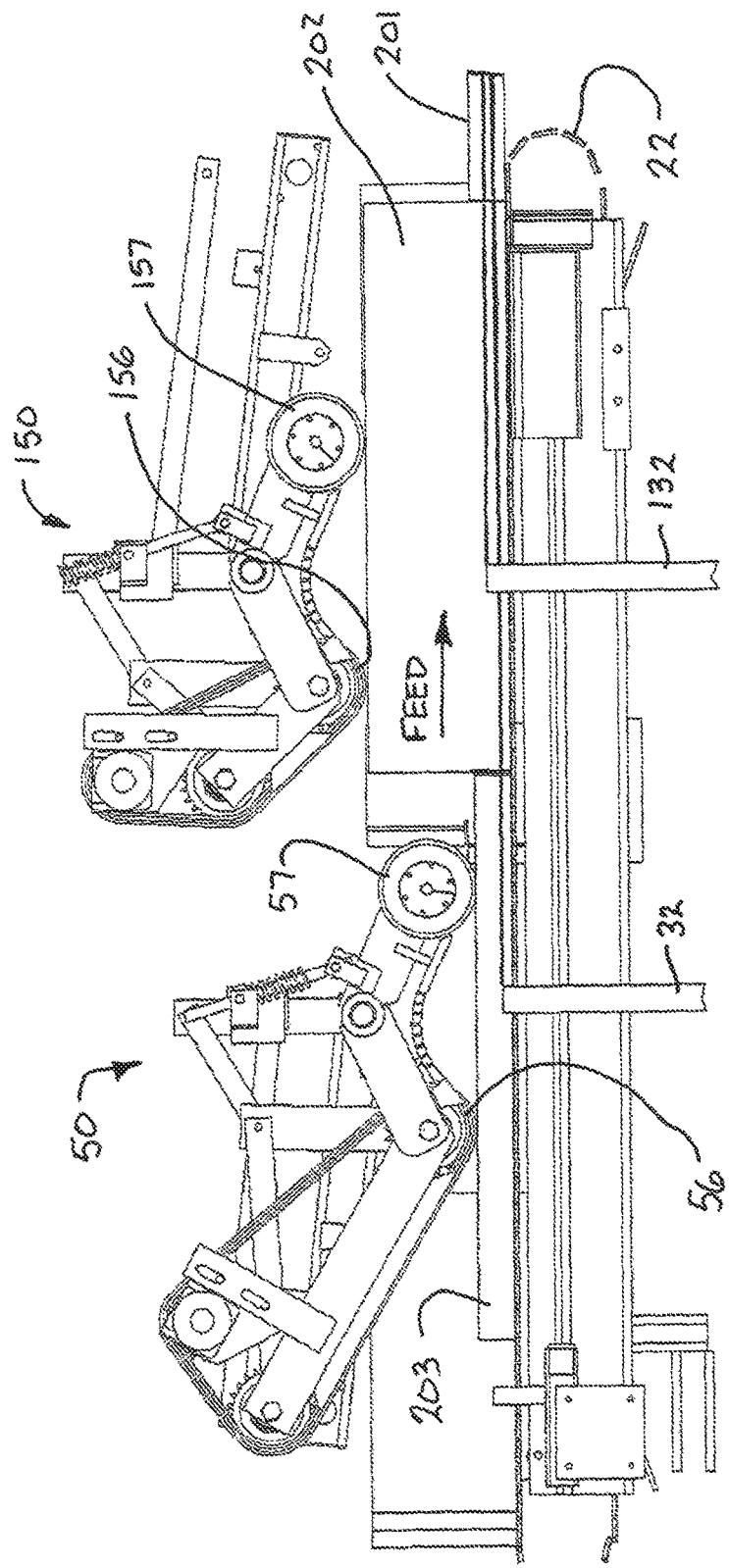

Finally, in FIG. 11, the trailing hold down wheel 57 of the first hold down mechanism 50 has stepped down to the upper surface of the third work piece 203 as it advances through the first saw blade 32. The second hold down mechanism 150 is similarly positioned as the second work piece advances through the second saw 132. The process continues as work pieces are fed through the machine with the hold down mechanisms assuring that the ends of each work piece are securely held against the conveyor base as the ends pass the saw blade. The result is cut boards/planks having uniform thickness for the entirety of their length.

Naturally, the invention is not limited to the foregoing embodiments, but it can also be modified in many ways without departing from the basic concepts. Changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

We claim:

1. A workpiece holddown apparatus for a bandsaw, the bandsaw having a main frame supporting a generally planar workpiece feed base, a feed conveyor for moving a plurality of workpieces arranged end-to-end and in contact with the feed base downstream along a feed path, individual workpieces having varying thickness above the feed base, and a saw blade arranged generally parallel to the feed base and transverse to the feed path for cutting each workpiece to a substantially uniform thickness as it passes the saw blade, the workpiece holddown apparatus comprising:
  a main carrier connected at a first end to the main frame and having a moveable second end spaced apart from the first end, the position of the second end being biased toward the feed base;
  a bogie carrier having generally opposing forward and rearward ends and a pivoting connection to the main carrier second end disposed between the forward and rearward ends, the bogie carrier being pivotable about an axis transverse to the feed direction;
  a rearward hold-down wheel connected to the rearward end and rotatable about a trailing axis positioned downstream of and generally parallel to the saw blade;
  a forward hold-down wheel connected to the forward end and rotatable about a leading axis positioned upstream of and generally parallel to the saw blade; and
  a drive frame disposed upstream of the forward hold-down wheel, the drive frame having an elongate moveable driving surface upwardly angled in relation to the feed base configured to frictionally engage a trailing workpiece having a greater height above the feed base than a preceding workpiece;
  wherein pivoting movement of the bogie carrier maintains the forward and rearward holddown wheels in contact with workpieces as individual workpieces having varying height above the feed base are moved past the saw blade, the main carrier position bias maintaining the workpieces in contact with the feed base.

2. The holddown apparatus of claim 1, further comprising a drive mechanism configured to rotate at least the forward hold-down wheel in a direction to tangentially engage each of the plurality workpieces moving downstream along the feed path, the drive mechanism further configured to move the forward hold-down wheel in a direction matching downstream movement of the plurality of workpieces along the feed path.

3. The holddown apparatus of claim 2, wherein the drive frame further includes a drive frame linkage having a proximal end connected to the forward end, the drive frame linkage further connected to the main carrier and configured to maintain the upward angle of the drive surface in relation to the feed base substantially unchanged as the bogie carrier moves between the first and second positions.

4. The holddown apparatus of claim 3, wherein the drive frame further includes an idler pulley disposed at a distal end forward and upwardly spaced apart from the forward hold-down wheel, and the driving surface comprises an endless loop feed structure encircling the idler pulley and the forward hold-down wheel.

5. The holddown apparatus of claim 4, wherein the driving surface comprises a chain having outwardly projecting engagement teeth for engaging the plurality of workpieces.

6. The holddown apparatus of claim 4, wherein the upward angle between the feed base and the driving surface ranges between greater than zero degrees and fifty degrees.

7. The holddown apparatus of claim 1, wherein the main carrier position bias toward the feed base is caused by the holddown apparatus weight.

8. The holddown apparatus of claim 1, further comprising a biasing mechanism that urging the main carrier position toward the feed base.

9. The holddown apparatus of claim 1, further including an intermediate guide disposed on the bogie carrier between the forward and rearward hold-down wheels and configured to guide the rearward hold-down wheel upward over a trailing workpiece having a greater height above the feed base than a preceding workpiece.

* * * * *